Nov. 5, 1968     C. L. WANLASS     3,409,822

VOLTAGE REGULATOR

Filed Dec. 14, 1965     2 Sheets-Sheet 1

CRAVENS L. WANLASS
INVENTOR.

BY *Lyon & Lyon*
ATTORNEYS 3,409,822
VOLTAGE REGULATOR
Cravens L. Wanlass, Santa Ana, Calif., assignor to Wanlass Electric Company, Santa Ana, Calif., a corporation of California
Filed Dec. 14, 1965, Ser. No. 513,752
16 Claims. (Cl. 323—22)

ABSTRACT OF THE DISCLOSURE

A voltage regulator employing a variable inductor as a series impedance and a feedback circuit for providing a signal whereby the impedance of said inductor is controlled. The feedback circuit incorporates a pair of transducers whose emitters are connected to ground through Zener diodes, the latter providing the feedback circuit with high gain and good stability as well as a reference potential against which the output is compared.

This invention relates to a voltage regulator and more particularly relates to a voltage regulator having a variable inductance as a series regulating element.

In U.S. patent application Ser. No. 455,939, filed May 14, 1965 by Leslie Kent Wanlass and entitled "Ferromagnetic Signal Transfer Device" there is disclosed a novel variable inductance device whose impedance can be controlled by the application of a direct current to a control winding. The theoretical considerations and operating principles of this variable inductor are described in detail in the aforementioned Wanlass application, the disclosure of which is incorporated by reference. Briefly, the variable inductance device has an AC or load winding and a DC or control winding wound on a ferromagnetic core in at least one portion of which a DC generated flux component and an AC generated flux component are in opposition at all times, i.e., on both halves of the AC cycle. As a result, the complete path of the AC flux within the core can be prevented from becoming saturated and the composite B-H characteristic of the core kept within its non-saturated region.

Since these two flux components always are in opposition in at least one portion of the path of the AC generated flux component, an increase in DC current means that an increase in AC current can be tolerated without distortion. Because the sense of the AC generated flux component reverses every half-cycle, and the sense of the DC generated flux component remains constant, in order to have a core having at least one portion in which at all times the DC flux component and the AC flux component are in opposition, it is necessary to provide the core with four regions in which both the AC and the DC flux components appear and two ends or joining portions for magnetically coupling the common regions or "legs." By properly positioning the pair of coils on such a core, a DC flux component can be caused to follow paths through legs 1 and 2 and through legs 3 and 4 and an AC flux component caused to follow paths through legs 1 and 4 and through legs 2 and 3. The AC flux component, of course, reverses its direction each half-cycle.

On each half-cycle, however, AC and DC flux components will exist in each leg and will be in opposition in the first pair of diagonal legs and in addition in the other pair of diagonal legs. For example, for the first sense of the AC flux component, legs 1 and 3 may have the AC and DC flux components in opposition while legs 2 and 4 will have these flux components in additive relationship.

It can thus be seen that each of the two legs in each of the paths of the AC flux will be at different points, on the magnetization curve of the core material. The leg in which the flux components are additive will be relatively far out on the magnetization curve and consequently will have a lower permeability and a higher reluctance while the leg in which the flux components are in opposition will have a higher permeability and a lower reluctance. As used herein, the terms "higher" and "increased" and "lower" and "decreased" as applied to permeability and reluctance are, of course, meant to be relative to the permeability and reluctance of the core when only the larger flux is present, or to state it another way, "lower" or "reduced" reluctance means the reluctance is closer to the nominal reluctance of the core material. "Higher" or "increased" means the reluctance is further from the nominal reluctance.

Since the total magnetic circuit encompassed by the load winding will include an additive leg and a bucking leg, the composite B-H characteristic of the circuit will be a composite of the two and will have a lower average or effective permeability and a higher effective reluctance than would the same path without the presence of the DC flux component. The average permeability of the path will decrease as the DC flux component is increased and consequently the composite B-H curve will be caused to rotate in a clockwise direction. Such a rotation indicates a decrease in average permeability and a corresponding decrease in average inductance presented to the load winding, and consequently it can be seen that by increasing the DC flux component, the inductance presented to the load winding is decreased. In this manner, the inductance can be varied linearly until the DC flux is raised to a value sufficiently high to rotate the B-H curve until it is flat, at which point control is lost and saturation will occur. If the DC flux value is increased still further, a point will be reached when the core is saturated even at the peaks of the AC flux. In this condition, the device will present its minimum inductance to the AC signal until the control current is reduced.

According to the present invention, the load winding of a variable inductor of the type described in the aforementioned Wanlass application is used as a series regulating element in an improved voltage regulating circuit. The inductor core is provided with a DC control winding which is coupled to a novel feedback circuit which senses the output of the regulator and compares it with a reference voltage. So long as the output voltage of the regulator maintains a certain relationship with the constant or reference voltage, the impedance of the load winding of the variable inductor will remain constant. However, if the output voltage should vary, the DC flux component in the core of the variable inductor will also vary with the result that the impedance of the load winding will be varied such that the output voltage will be returned to the desired level.

It is therefore an object of the present invention to provide a voltage regulating circuit which is accurate and relatively inexpensive.

It is another object of the present invention to provide such a regulating circuit in which the level of the desired output voltage may be varied.

It is also an object of the present invention to provide such a regulating circuit which will react to either load or line changes and which is inherently current limiting.

It is a further object of the present invention to provide a novel control circuit for a voltage regulator or the like.

These and other objects and advantages of the present invention will become more apparent upon reference to the accompanying description and drawings in which.

Figure 1:
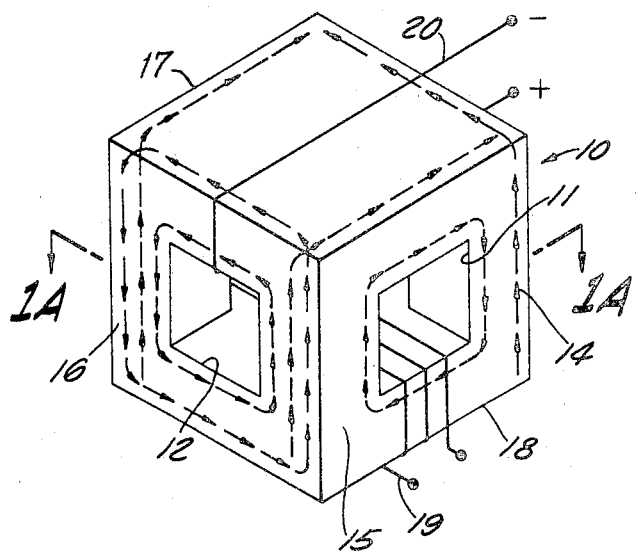
FIGURES 1 and 1A illustrate a typical variable inductance device of the type disclosed in the aforementioned Wanlass application.

In the drawings, the convention adopted in the aforesaid Wanlass application is followed. That is, a core and its associated windings, constructed in accordance with the invention of that application, is indicated by the use of a T-shaped iron core symbol. Although one embodiment of such a core is illustrated and described in this application in order to impart a better understanding of the present invention, the present invention is not to be considered limited to any of the specific core shapes disclosed in the aforementioned Wanlass application as any of them or their equivalents could be used in the present invention.

Turning now to FIGURE 1, a core of the type disclosed and claimed in the aforementioned Wanlass application is illustrated. A ferromagnetic core 10 is provided with intersecting transverse openings or passageways 11 and 12. The core is thus provided with four legs or common regions 13, 14, 15 and 16, and end or cap regions 17 and 18 which join the legs with a mass of ferromagnetic material. A first winding 19 is wound around the cap region 18 through the opening 11 while a second winding 20 is wound around the cap region 17 through the opening 12. A direct current is applied to the winding 20, the unidirectional flux generated by the current in the winding 20 controlling the permeability and reluctance of the path followed by the flux generated by the alternating current in the winding 19.

Figure 1A:
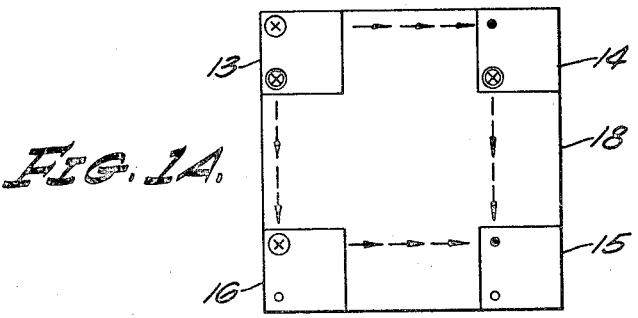

As shown in FIGURES 1 and 1A, the magnetic circuit of the unidirectional flux generated by the direct current in the winding 20, indicated by the solid arrows, the solid dots and the X's surrounded by a single circle, includes two paths. The first of these paths is through the end region 17, the leg 16, the end region 18 and the leg 15 while the second is through the end region 17, the leg 13, the end region 18, and the leg 14. The magnetic circuit of the alternating flux, indicating by the broken arrows, the open dots and the X's surrounded by a double circle, generated as the result of the alternating current in the winding 19 also includes two paths; a first path through the end region 17, the leg 14, the end region 18 and the leg 15, and a second path through the end region 17, the leg 13, the end region 18 and the leg 16.

Of course, in each of the legs or common regions, there is only one flux having alternating and unidirectional components. However, for purposes of clarity in discussing the invention, these flux components will sometimes be referred to simply as fluxes. As can be seen, on the first half-cycle of the alternating current, the unidirectional flux component and the alternating flux component are in additive relationship in the legs 13 and 15 but are in opposing relationship in the legs 14 and 16. Consequently, the permeability of the legs 14 and 16 is much greater than the permeability in the legs 13 and 15 and the reluctance in the legs 14 and 16 is lower than the reluctance in the legs 13 and 15. Of course, on the second half-cycle of the alternating current, the flux components will be in opposition in the legs 13 and 15 and adding in the legs 14 and 16. On either half-cycle, however, each alternating flux path will contain one additive leg and one subtractive leg.

As the result of the additive flux components in the leg 15 and the subtractive flux components in the leg 14, the effective permeability of the first path followed by the alternating flux is also reduced because this path also includes one common region in which the flux components are in opposition and a second common region in which they are in additive relationship. The effective permeability of each path followed by the alternating flux is thus reduced and consequently the effective inductance of the winding 19 is reduced. The core is preferably made symmetrical so that its operation will be identical in each half-cycle of the alternating current. The inductance varies linearly until the DC flux component is sufficiently high to saturate its flux paths. If the AC flux components is sufficiently high during its cycle to drive the opposing legs out of saturation, the inductance will vary non-linearly and will effectively clip the AC signal. If the AC flux is not sufficiently high to drive the opposing legs out of saturation, the load winding will present its minimum inductance throughout the AC cycle.

Figure 2:
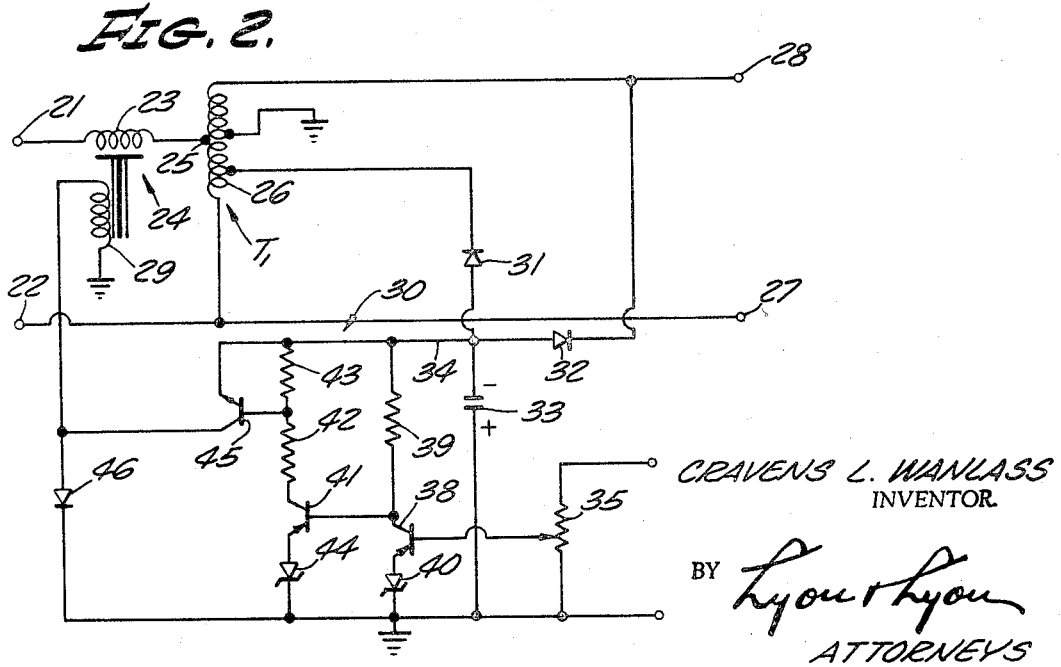
FIGURE 2 is a schematic diagram of a first embodiment of the present invention.

Turning now to FIGURE 2, an AC voltage regulator is illustrated. The AC voltage to be regulated is applied to a pair of input terminals 21 and 22. The input terminal 21 is connected to one end of the load winding 23 of a variable inductor 24 of the type described above and in the aforementioned Wanlass application. The other end of the winding 23 is connected to a tap 25 of the winding 26 of an autotransformer T₁. One end of the winding 26 is connected to the input terminal 22 and one output terminal 27 while the other end of the winding 26 is connected to the other output terminal 28.

The control winding 29 of the variable inductor 24 is fed with the output of a feedback or control circuit indicated generally at 30. The control circuit 30 is energized by means of a full wave rectifier made up of diodes 31 and 32 connected across a section of the winding 26, the center of the section being grounded. The output of the full wave rectifier is filtered by a capacitor 33 which is connected between the junction of the diodes 31 and 32 and ground. The rectified and filtered DC voltage appears on the line 34.

The output of the sensing circuit (not shown) which supplies a DC voltage proportional to the AC output voltage is applied across a potentiometer 35. As will be obvious to those skilled in the art, the sensing circuit could be arranged to provide a DC voltage proportional to the RMS, the average, or the peak value of the AC voltage. For example, it could consist simply of a transformer coupled across the output terminals 27 and 28 with the output of the transformer rectified and connected across the potentiometer 35.

The wiper arm of the potentiometer 35 is connected to the base of a first PNP transistor 38. The emitter of the transistor 38 is coupled to ground through a Zener diode 40. The Zener diode 40 maintains the emitter of the transistor 38 at a constant voltage and causes it to act as a comparator between the Zener reference voltage and the input from the sensing circuit. The Zener diode 40 also provides a very low impedance AC path for the emitter of the transistor 38 and thus this stage acts like a grounded emitter stage with resultant high gain. Preferably the Zener diode 40 is chosen with regard to the temperature characteristics of the transistor 38 so that the emitter-base drop in the transistor will be compensated for by an equal drop in Zener voltage.

The collector of the transistor 38 is also coupled to the base of a second PNP transistor 41 whose collector is connected to the line 34 through resistors 42 and 43 and whose emitter is connected to ground through a Zener diode 44. Zener diode 44 biases the transistor 41 and also causes it to act like a grounded emitter stage. If desired, the Zener diode 44 could be replaced by any suitable biasing network. However, the use of the Zener diode is preferred so that the base of the transistor 41 can go high enough to cut off the transistor 41. For this purpose, the Zener voltage of the diode 44 should at least exceed the Zener voltage of the diode 40 by the saturation voltage of the transistor 38. An NPN transistor 45 has its base coupled to the junction of the resistors 42 and 43 and its emitter coupled to the line 34. The resistor 42 is not necessary for circuit operation but is desirable to protect transistor 41 against excessive current. The collector of the transistor is coupled through the control winding 29 of the variable inductor 24 to ground. The collector of the transistor 45 is also coupled through the diode 46 to ground to protect the transistor 45 from excessive collector voltage due to inductive kick from the control winding 29 of the variable inductor 24.

The operation of the circuit shown in FIGURE 2 will now be explained. Assume first that the output voltage appearing across the terminals 27 and 28 increases due to either a change in load or a change in line voltage or both. In response to this increased voltage, the sensing circuit will cause the negative voltage across the potentiometer 35 to increase with the result that the voltage appearing on the base of the transistor 38 goes more negative. This causes the transistor 38 to conduct more heavily and causes an increase in the voltage drop across the resistor 39. This in turn causes the base of the transistor 41 to go more positive with the result that the current through the transistor 41 decreases as does the voltage across the resistor 43. The decrease in voltage across the resistor 43 will cause the base of transistor 45 to go more negative which will result in the transistor 45 becoming less conductive.

The decrease in the current flowing through the transistor 45 results in a decrease in the current flowing in the control winding 29 of the variable inductor 24. This decrease in control current in the variable inductor 24 causes the inductance of the load winding 23 of the variable inductor 24 to increase. The increase in inductance of the load winding 23 causes a correspoding decrease in the voltage applied to the autotransformer which in turn causes a reduction in the AC output voltage. This reduction in output voltage will continue until the desired output voltage is again reached.

Assume now that the output voltage appearing across the terminals 27 and 28 decreases. This results in a decrease in negative voltage across the potentiometer 35. This causes the various transistors of the control circuit to operate in the reverse of the manner just described with the result that the current through the transistor 45, and through the control winding 29, is increased with the result that the inductance of the load winding 23 is decreased and the output voltage appearing across the terminals 27 and 28 is increased. The level at which the output voltage can be maintained is selected by the setting of the wiper arm of the potentiometer 35. Since it is usually desired to have as little power loss as possible in the series regulating element and since linearity of control is usually not too important in a regulator, it may be desirable to operate the device in or close to saturation so that it presents the minimum possible inductance. When operated in this mode, the device clips the AC signal in a manner somewhat similar to the operation of a saturable reactor. An increase in control current, reflecting an increase in output voltage will drive the core further into saturation and thus clip less of the line signal—a decrease in control current drives the core closer to the non-saturated condition so that increased clipping occurs.

Figure 3:
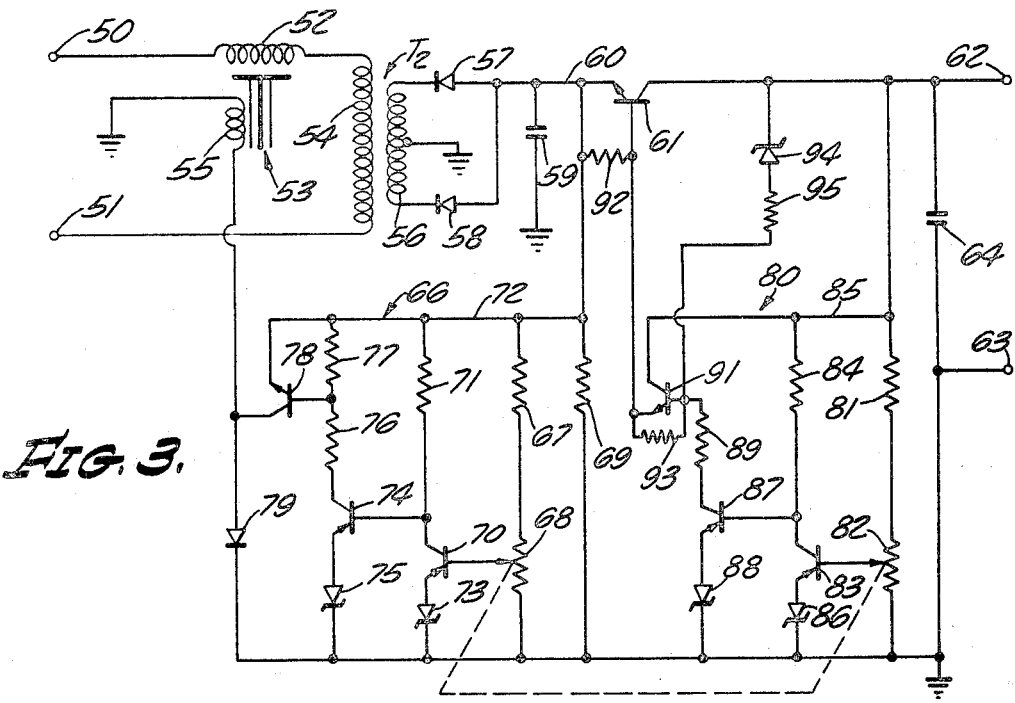
FIGURE 3 is a schematic diagram of a second embodiment of the present invention.

Typical types and values for the elements of the circuit just described are:

$R_{39} = 10K\ \Omega$  $Z_{40} = 7$ volts
$R_{42} = 1.2K\ \Omega$  $Z_{44} = 12$ volts
$R_{43} = 490\ \Omega$  $Q_{38} = 2N3638$
$R_{35} = 1.5K\ \Omega$  $Q_{41} = 2N3638$
$C_{33} = 1000\ \mu f.$  $Q_{45} = MJ2249$ Turning now to FIGURE 3, there is illustrated a regulated DC power supply according to the present invention. An AC voltage is connected to input terminals 50 and 51. The input terminal 50 is connected to one end of the load winding 52 of a variable inductor 53 of the type described in the aforementioned Wanlass application. The other end of the winding 52 is connected to one side of the primary winding 54 of a transformer $T_2$, the other end of the winding 54 being connected to the input terminal 51. As explained above, the impedance of the load winding 52 of the variable inductor 53 is controlled by the direct current flowing through the control winding 55 of the variable inductor 53.

The voltage induced in the secondary winding 56 of the transformer $T_2$ is rectified by diodes 57 and 58 and filtered by a capacitor 59 with the result that a DC voltage appears on the line 60. An NPN transistor 61 has its emitter connected to the line 60 and its collector connected to a first output terminal 62. The other output terminal 63 is grounded. Additional filtering of the output voltage is accomplished by means of a capacitor 64 connected between the output terminals 62 and 63.

A first control or feedback circuit 66 is provided to control the variable inductor 53. A resistor 67 and a potentiometer 68 are connected between the line 60 and ground and are shunted by a bleeder resistor 69. The base of a PNP transistor 70 is coupled to the wiper of the potentiometer 68. The collector of the transistor 70 is connected through a resistor 71 to a line 72 which in turn is connected to the line 60. The emitter of the transistor 70 is coupled through a Zener diode 73 to ground. The collector of the transistor 70 is also connected to the base of a second PNP transistor 74 whose emitter is coupled to ground through a Zener diode 75 and whose collector is connected to the line 72 by a pair of resistors 76 and 77. The base of an NPN transistor 78 is connected to the junction of the resistors 76 and 77 while the emitter of this transistor is coupled to the line 72 and the collector is connected to the control winding 55 of the variable inductance device 53. The collector is also connected through a diode 79 to ground.

As can be seen, this feedback circuit 66 is similar to the circuit 30 shown and described as controlling the variable inductor in FIGURE 2 and operates in a similar manner to maintain the voltage E, the voltage at the emitter of transistor 61, at a desired value as set by the potentiometer 68.

The direct current voltage appearing across the output terminals 62 and 63 is applied to a second control or feedback circuit 80 by the series combination of a resistor 81 and a potentiometer 82 connected across terminals 62 and 63. The wiper arm of the potentiometer 82 is connected to the base of the PNP transistor 83 and is mechanically ganged with the wiper arm of the potentiometer 68. The collector of the transistor 83 is coupled through a resistor 84 to a line 85 which is connected to the output terminal 62. The emitter of the transistor 83 is coupled to ground through a Zener diode 86. The collector of the transistor 83 is also connected to the base of a PNP transistor 87 having its emitter connected to ground through a Zener diode 88 and having its collector connected to one end of a resistor 89. The other end of the resistor 89 is connected to the base of a NPN transistor 91, the emitter of which is connected to the base of the transistor 61. A resistor 92 is provided to bias the transistor 61 off in the event that no current is supplied to its base by the control circuit 80. A similar resistor 93 is provided for the transistor 91.

A Zener diode 94 and a resistor 95 are coupled between the base of the transistor 91 and the collector of transistor 61 and are used to allow the regulator to start under load.

As can be seen, the feedback circuit 80 controlling the series impedance of the transistor 61 is basically similar to that feedback circuit 30 shown in FIGURE 2 and a detailed description of its operation is therefore not considered necessary. The only difference between the two circuits is that the transistor 91 is connected as an emitter follower so that additional current gain is provided and no signal inversion occurs. Thus, when the transistor 87 becomes less conductive as a result of an increase in output voltage, the transistor 91 also becomes less conductive. The resulting increased voltage drop across the transistor 61 results in a decrease of the voltage appearing across the output terminals 62 and 63. In the event that the voltage across the output terminals decreases, the feedback circuit causes the transistor 61 to become more conductive with the result that the output voltage rises. The regulating circuit just described has a very rapid response and acts to eliminate ripple from the DC voltage and also takes care of all fast transients because of its very rapid response time.

The power supply shown in FIGURE 3 thus has two separate regulating stages. The first or pre-regulating stage utilizes a variable inductor of the type disclosed in the aforementioned Wanlass application and serves to take care of all average changes in load or line condition. The second or final regulator stage eliminates ripple from the DC voltage and takes care of fast transients. The second regulating stage, and particularly the series transistor 61, is operated such that the output voltage appearing between the terminals 62 and 63 is several volts less negative than the output voltage appearing on the line 60. This is done so that there always is enough collector voltage across the transistor 61 to prevent it from saturating so that it may operate properly.

The two regulating stages operate together as follows: Assume that the voltage appearing between the terminals 62 and 63 rises. Immediately, the final regulator stage senses the increase in output voltage magnitude and causes the impedance of the transistor 61 to increase which causes a greater voltage drop across it and which in turn reduces the output voltage toward the desired value. Since the preregulator stage is much slower than the final regulator stage, there may be increased dissipation in the final regulator stage before the preregulator stage has returned the voltage on the line 60 to its desired value. The time during which this increased dissipation occurs, however, is usually very small, on the order of $\frac{1}{10}$ of a second. The two regulator stages output voltage track for any set output voltage due to the ganging of the potentiometers 68 and 82. The circuit gives excellent characteristics in respect to regulation to load and line changes and has very good response time. It is also very efficient because of the use of the preregulator stage.

Typical types and values for the elements of the circuit of FIGURE 3 are:

$R_{67}$=4.7KΩ
$R_{68}$=2.5KΩ
$R_{69}$=150Ω
$R_{71}$=1.2KΩ
$R_{76}$=1KΩ
$R_{77}$=470Ω
$R_{81}$=3.9KΩ
$R_{82}$=2.5KΩ
$R_{84}$=10KΩ
$R_{89}$=1.2KΩ
$R_{92}$=10Ω
$R_{93}$=470Ω
$R_{95}$=1KΩ
$C_{59}$=10,000 μf.

$C_{64}$=1000 μf.
$Q_{61}$=2N3055
$Q_{70}$=2N3638
$Q_{74}$=2N3638
$Q_{78}$=MJ2249
$Q_{83}$=2N3638
$Q_{87}$=2N3638
$Q_{91}$=MJ2249
$Z_{73}$=7 volts
$Z_{75}$=12 volts
$Z_{86}$=7 volts
$Z_{94}$=7 volts
$Z_{98}$=12 volts Turning now to FIGURE 4, there is illustrated a variable DC power supply according to the present invention. This circuit is basically similar to that of FIGURE 3 but differs therefrom in two respects; (1) a variation in the output suply voltage from zero to full output voltage is made possible by the use of a variable autotransformer, and (2) the supply from the feedback or control circuit is separate from the main supply so that sufficient voltage is always present to allow proper operation of the control circuit regardless of the magnitude of the main supply output voltage.

Figure 4:
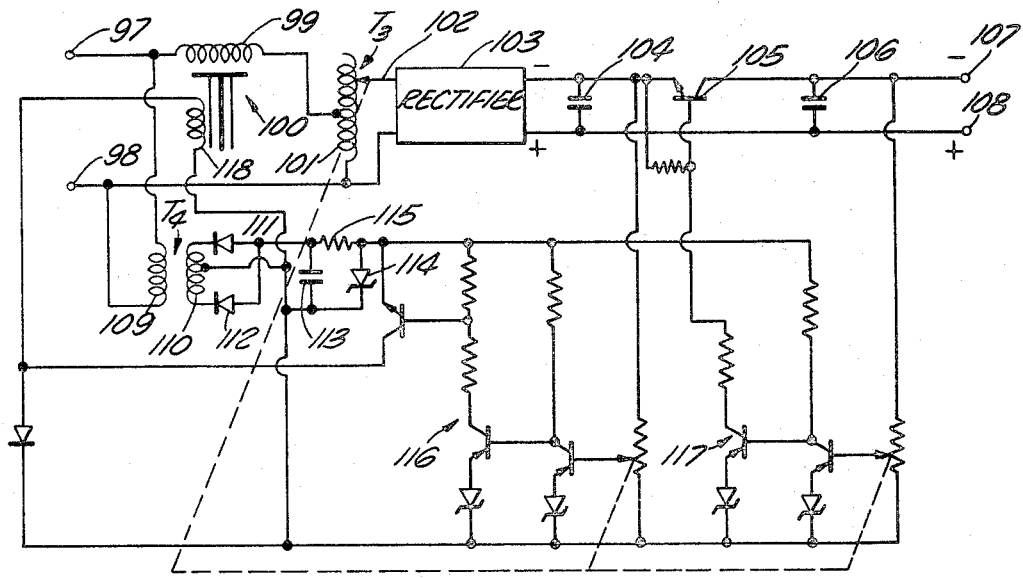
FIGURE 4 is a schematic diagram of a third embodiment of the present invention.

In FIGURE 4, an AC voltage supply is connected to input terminals 97 and 98. The input terminal 97 is connected to one end of the load winding 99 of a variable inductance device 100 of the type disclosed above and in the above-identified Wanlass application. The other end of the winding 99 is connected to a tap on the winding 101 of a variable autotransformer $T_3$. The other end of the winding 101 is connected to the other input terminal 98. The output of the variable autotransformer $T_3$ as selected by the wiper 102 is rectified in a rectifier 103 and filtered by a capacitor 104. An NPN transistor 105 serves as a series impedance element to regulate the output of the rectifier 103 to provide a regulated DC output voltage which is filtered by capacitors 104 and 106 and which appears across output terminals 107 and 108.

The primary winding 109 of a transformer $T_4$ is connected across the input terminals 97 and 98. The voltage induced in the secondary winding 110 of the transformer $T_4$ is rectified by rectifiers 111 and 112, filtered by capacitor 113, and regulated by Zener diode 114 and resistor 115 and serves as a regulated voltage supply for feedback or control circuits 116 and 117. The operation of the feedback circuit 116 is identical to the operation of the feedback circuit 30 described in connection with FIGURE 1 and serves to provide the control winding 118 of the variable inductor device 100 with a direct current such that any changes in the output of the rectifier 103 are compensated for by a change in the impedance of the winding 99 of the variable inductance device 100 in the manner previously described.

The feedback circuit 117 operates in the same manner as the feedback circuit 80 of FIGURE 3 and causes the conductance and hence the impedance of the series transistor 105 to be varied in accordance with the output voltage. As shown in this figure there is no transistor equivalent to the transistor 91 shown in FIGURE 3. However, such a transistor can be used if desired and, conversely, need not be used in FIGURE 3. The wiper arms of the potentiometers are mechanically ganged with the wiper 102 of the autotransformer $T_3$ so that any desired output from zero to full value may be selected. Any change in output voltage setting will not affect the operation of the control circuits because their voltage supply is from the primary side of the autotransformer $T_3$. Of course, the embodiments of FIGURE 2 or 3 could also have their control circuits supplied in this manner if desired and any of the circuits could use either transformers or autotransformers as desired. The typical types and values of the elements of the circuit of FIGURE 4 are similar to those of the circuit of FIGURE 3. As will be obvious to those skilled in the art, a positive voltage could be used in place of the negative voltage described by reversing the types of the transistors shown and the polarities of the diodes.

The use of the variable inductance device of the type disclosed makes each of the regulating circuits described inherently current limiting. As the feedback circuit increases, the inductance of the load winding decreases until it reaches its minimum value. Any further increase in control current has no effect and thus the maximum load current will be predetermined by the inductor minimum impedance value. Since the circuits use no tuned filter circuits or ferroresonant circuits for regulation, the circuits are, within reasonable bounds, insensitive to line frequency changes or a lagging power factor.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. A voltage regulating system comprising:
an input;
an output;
a variable inductance device comprising a ferromagnetic core, a load winding wound on said core and encompassing a first magnetic circuit therein, and control winding means wound on said core for generating a unidirectional flux therein, said unidirectional flux encompassing a second magnetic circuit in said core, portions of said second magnetic circuit being common with portions of said first magnetic circuit whereby variation of said unidirectional flux causes the hysteresis loop of said first magnetic circuit to rotate and the inductance of said load winding to change;

means coupling said load winding between said input and said output;

means for deriving a signal representative of the voltage appearing across said output;

a DC voltage supply; and control circuit means coupled between said signal deriving means and said control winding means of said variable inductance device for varying the current through said control winding means in response to variations in output voltage whereby the hysteresis loop of said first magnetic circuit is caused to rotate and the inductance of said load winding is varied comprising:

a first transistor having an emitter, a collector and a base;

a first Zener diode coupling said emitter to one side of said DC supply;

first resistive means coupling said collector to the other side of said DC supply;

means coupling said base to said signal deriving means;

a second transistor having an emitter, a collector and a base;

a second Zener diode coupling said emitter of said second transistor to said one side of said DC supply;

second resistive means coupling the collector of said second transistor to said other side of said DC supply;

means coupling said base of said second transistor to said collector of said first transistor;

a third transistor having an emitter, a collector and a base, said emitter of said third transistor being coupled to said other side of said DC supply and said collector of said third transistor being coupled to said control winding; and means coupling the base of said third transistor to said second resistive means.

2. The system of claim 1 wherein said DC voltage supply comprises rectifier means coupled across at least a portion of said output voltage.

3. The system of claim 1 wherein said collector of said third transistor is coupled to said one side of said DC voltage supply by a diode.

4. The system of claim 1 wherein said means coupling said load winding between said input and said output further include an autotransformer coupled between said load winding and said output.

5. A voltage regulating system comprising:
an input;
an output;
a variable inductance device comprising a ferromagnetic core, a load winding wound on said core and encompassing a magnetic circuit therein, and control winding means wound on said core and responsive to changes in a control signal applied thereto for effectively rotating the hysteresis loop of said magnetic circuit and thereby varying the inductance of said load winding;
means coupling said load winding to said input;
a first transistor having an input electrode, an output electrode and a control electrode;
means coupling said input electrode to said load winding;
means coupling said output electrode to said output;
a DC voltage supply;
first means for deriving a signal representative of the voltage appearing at said input electrode of said first transistor;

first control circuit means coupled between said first signal deriving means and said control winding means of said variable inductance device for applying a control signal thereto, said control signal varying in response to variations of said voltage appearing at said input electrode of said first transistor, said control circuit means comprising:

a second transistor having input and output electrodes and a control electrode;
a first Zener diode;
means coupling said input and output electrodes of said second transistor and said first Zener diode in series across said DC voltage supply;
means coupling said control electrode of said second transistor to said signal deriving means;
a third transistor having input and output electrodes and a control electrode;
means coupling said input and output electrodes of said third transistor across said DC supply;
means coupling said control electrode of said third transistor to the output electrode of said second transistor;
a fourth transistor having input and output electrodes and a control electrode;
means coupling the control electrode of said fourth transistor to the output electrode of said third transistor; and
means coupling said fourth transistor and said control winding means across said DC voltage supplying means;

second means for deriving a signal representative of the output voltage; and second control circuit means coupled betwen said second signal deriving means and said control electrode of said first transistor for varying the impedance of said first transistor in response to variations of said output voltage.

6. The system of claim 5 wherein said second control circuit means comprises:
a fifth transistor having input and output electrodes and a control electrode;
a third Zener diode;
means coupling said input and output electrodes of said fifth transistor and said third Zener diode in series across said DC supply;
means coupling said control electrode of said fifth transistor to said second signal deriving means;
a sixth transistor having input and output electrodes and a control electrode;
a fourth Zener diode;
means coupling said input and output electrodes of said sixth transistor and said fourth Zener diode across said DC supply;
means coupling the control electrode of said sixth transistor to said output electrode of said fifth transistor; and
means coupling the output electrode of said sixth transistor with the control electrode of said first transistor.

7. The system of claim 6 wherein said means coupling the output electrode of said sixth transistor with the control electrode of said first transistor comprises an emitter follower.

8. A voltage regulating system comprising:
an input;
an output;
a variable inductance device comprising a ferromagnetic core, a load winding wound on said core and encompassing a magnetic circuit therein, the effective reluctance of said magnetic circuit controlling the inductance of said load winding, and control winding means wound on said core for generating a unidirectional flux therein, said unidirectional flux controlling said effective reluctance of said magnetic circuit whereby variations in said unidirectional flux cause the hysteresis loop of said magnetic circuit to rotate;

means coupling said load winding to said input;

a first transistor having an emitter, a collector and a base;

means coupling said emitter to said load winding;

means coupling said collector to said output;

a DC voltage supply;

first means for deriving a signal representative of the voltage appearing at said emitter of said first transistor;

first control circuit means coupled between said first signal deriving means and said control winding means of said variable inductance device for varying the current therein in response to variations of said voltage appearing at said emitter of said first transistor, whereby the unidirectional flux generated in said core and the inductance of said load winding are varied, said control circuit means comprising:

a second transistor having an emitter, a collector and a base;

a first Zener diode coupling said emitter of said second transistor to one side of said DC supply;

first resistive means coupling said collector of said second transistor to the other side of said DC supply;

means coupling said base of said second transistor to said first signal deriving means;

a third transistor having an emitter, a collector and a base;

a second Zener diode coupling said emitter of said third transistor to said one side of said DC supply;

second resistive means coupling the collector of said third transistor to said other side of said DC supply;

means coupling said base of said third transistor to said collector of said second transistor;

a fourth transistor having an emitter, a collector and a base, said emitter of said fourth transistor being coupled to said other side of said DC supply and said collector of said fourth transistor being coupled to said control winding means; and means coupling the base of said fourth transistor to said second resistive means;

second means for deriving a signal representative of the output voltage;

second control circuit means coupled between said second deriving means and said base of said first transistor for varying the impedance of said first transistor in response to variations of said output voltage, said second control circuit means comprising:

a fifth transistor having an emitter, a collector and a base;

a third Zener diode coupling said emitter of said fifth transistor to said one side of said DC supply;

third resistive means coupling said collector to said other side of said DC supply;

means coupling said base of said fifth transistor to said second signal deriving means;

a sixth transistor having an emitter, a collector and a base;

a fourth Zener diode coupling said emitter of said sixth transistor to said one side of said DC supply;

fourth resistive means coupling the collector of said sixth transistor to said other of said DC supply;

means coupling said base of said sixth transistor to said collector of said fifth transistor; and means coupling the base of said first transistor to said fourth resistive means.

9. The system of claim 8 wherein said means coupling the base of said first transistor to said fourth resistive means comprises an emitter follower.

10. The system of claim 8 wherein said means coupling said emitter of said first transistor to said load winding comprises a transformer having a primary winding connected to said load winding and a secondary winding coupled to said emitter through rectifying means.

11. The system of claim 8 wherein said means coupling said emitter of said first transistor to said load winding includes a variable autotransformer having its primary connected to said load winding and its secondary connected to said emitter through rectifying means.

12. The system of claim 8 wherein said DC voltage supply comprises a transformer having its primary coupled across said input and its secondary connected to rectifying means.

13. The system of claim 8 wherein said first and second signal deriving means comprise potentiometers having their wiper arms mechanically ganged.

14. A voltage regulating system comprising:

an input;

an output;

a variable inductance device comprising a ferromagnetic core, a load winding wound on said core and encompassing a first magnetic circuit therein, and control winding means wound on said core for generating a unidirectional flux therein, said unidirectional flux encompassing a second magnetic circuit in said core, portions of said second magnetic circuit being common with portions of said first magnetic circuit whereby variation of said unidirectional flux causes the hysteresis loop of said first magnetic circuit to rotate and the inductance of said load winding to change;

means coupling said load winding between said input and said output;

means for deriving a signal representative of the voltage appearing across said output;

a DC voltage supply; and control circuit means coupled between said signal deriving means and said control winding means of said variable inductance device for varying the current through said control winding means in response to variations in output voltage whereby the hysteresis loop of said first magnetic circuit is caused to rotate and the inductance of said load winding is varied comprising:

a first transistor having an emitter, collector and a base;

means coupling said emitter and said collector of said second transistor across said DC supply, said means including a first Zener diode connected to said emitter of said first transistor and first resistive means connected to said collector of said first transistor;

means coupling said base of said first transistor to said signal deriving means;

a second transistor having an emitter, a collector and a base;

means coupling said emitter and said collector of said second transistor across said DC supply, said means including a second Zener diode connected to said emitter of said second transistor and second resistive means connected to the collector of said second transistor;

means coupling said base of said second transistor to said collector of said first transistor;

a third transistor having an emitter, a collector and a base, said emitter of said third transistor being coupled to one side of said DC supply and said collector of said third transistor being coupled to said control winding; and means coupling the base of said third transistor to said second resistive means.

15. The circuit of claim 14 wherein said biasing means comprises a second Zener diode having a Zener voltage higher than the Zener voltage of said first Zener diode by at least the saturation voltage of said first transistor.

16. The circuit of claim 15 wherein said first diode serves to temperature compensate said first transistor.

References Cited

UNITED STATES PATENTS

| | | | |
|---|---|---|---|
| 3,102,225 | 8/1963 | Kenny et al. | 323—22 |
| 3,103,617 | 9/1963 | Schneider et al. | 323—22 |
| 3,214,678 | 10/1965 | Higginbotham | 323—22 |
| 3,268,798 | 8/1966 | Burski | 323—66 |
| 3,281,654 | 10/1966 | Reinert | 323—45 |

MILTON O. HIRSHFIELD, *Primary Examiner.*

W. E. RAY, *Assistant Examiner.*